US010540692B2

(12) United States Patent
Hu et al.

(10) Patent No.: US 10,540,692 B2
(45) Date of Patent: Jan. 21, 2020

(54) PRESENTING DEALS TO A USER OF SOCIAL NETWORKING SYSTEM

(75) Inventors: Bo Hu, San Jose, CA (US); Kelly Winters, San Francisco, CA (US); Emily Clark White, Palo Alto, CA (US); Evan Sharp, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 354 days.

(21) Appl. No.: 13/181,307

(22) Filed: Jul. 12, 2011

(65) Prior Publication Data

US 2013/0179268 A1    Jul. 11, 2013

Related U.S. Application Data

(60) Provisional application No. 61/452,577, filed on Mar. 14, 2011.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0269* (2013.01); *G06Q 30/0207* (2013.01); *G06Q 30/0241* (2013.01); *G06Q 50/01* (2013.01)

(58) Field of Classification Search
CPC .................................................. G06Q 30/02
(Continued)

(56) References Cited

U.S. PATENT DOCUMENTS 6,269,343 B1    7/2001 Pallakoff
8,010,460 B2    8/2011 Work et al.
(Continued)

FOREIGN PATENT DOCUMENTS

CN    1316714 A    10/2001
CN    101470886 A    7/2009
(Continued)

OTHER PUBLICATIONS

PCT International Search Report and Written Opinion for International Patent Application No. PCT/US2012/028349, dated May 29, 2012, 12 pages.
(Continued)

*Primary Examiner* — Arthur Duran
(74) *Attorney, Agent, or Firm* — Fenwick & West LLP

(57) ABSTRACT

A social networking system suggests deals relevant to a user. The deals are selected for suggestion based on social information associated with the user. Social information used for selecting candidate deals for a user includes information describing other users connected to the user and their associations with the candidate deals or with related deals, for example, deals from the same provider. Associations of connections of the user with the candidate deals may be determined based on actions associated with the candidate deals performed by the connections. The actions performed by the connections may be weighted based on types of the actions to determine a measure of relevance of the candidate deal for the user. Candidate deals are selected from a set of deals by applying deal targeting criteria received from deal providers. The deal targeting criteria specify attributes describing users to be targeted for a particular deal.

19 Claims, 8 Drawing Sheets

(58) Field of Classification Search
USPC .......................................................... 705/14
See application file for complete search history.

(56) References Cited

U.S. PATENT DOCUMENTS

| | | | |
|---|---|---|---|
| 8,140,402 B1* | 3/2012 | Mesaros | ...................... 705/26.1 |
| 2006/0085259 A1 | 4/2006 | Nicholas et al. | |
| 2006/0212355 A1 | 9/2006 | Teague et al. | |
| 2008/0082420 A1 | 4/2008 | Kargman et al. | |
| 2008/0133336 A1 | 6/2008 | Altman et al. | |
| 2008/0140476 A1 | 6/2008 | Anand et al. | |
| 2008/0189169 A1 | 8/2008 | Turpin et al. | |
| 2008/0281622 A1 | 11/2008 | Hoal | |
| 2008/0294994 A1 | 11/2008 | Kruger et al. | |
| 2008/0306826 A1 | 12/2008 | Kramer et al. | |
| 2009/0119167 A1* | 5/2009 | Kendall et al. | ................. 705/14 |
| 2009/0157439 A1 | 6/2009 | Fuchs | |
| 2009/0222348 A1* | 9/2009 | Ransom | ................. G06Q 30/02 705/14.73 |
| 2009/0319359 A1 | 12/2009 | Soza et al. | |
| 2010/0030578 A1 | 2/2010 | Siddique et al. | |
| 2010/0121696 A1 | 5/2010 | Green et al. | |
| 2010/0228617 A1 | 9/2010 | Ransom et al. | |
| 2010/0257028 A1* | 10/2010 | Hillerbrand | ...................... 705/10 |
| 2010/0332304 A1 | 12/2010 | Higgins et al. | |
| 2011/0029364 A1* | 2/2011 | Roeding | ................ G06Q 30/00 705/14.16 |
| 2011/0161130 A1* | 6/2011 | Whalin et al. | ................ 705/7.18 |
| 2012/0029992 A1 | 2/2012 | De Facendis | |
| 2012/0072271 A1 | 3/2012 | Dessert et al. | |
| 2012/0130784 A1 | 5/2012 | Neuhauser et al. | |
| 2012/0166267 A1 | 6/2012 | Beatty et al. | |
| 2012/0209722 A1 | 8/2012 | Plut | |
| 2012/0221387 A1 | 8/2012 | Liu et al. | |
| 2012/0290433 A1 | 11/2012 | England et al. | |
| 2013/0060623 A1 | 3/2013 | Walker et al. | |
| 2013/0060637 A1 | 3/2013 | Walker et al. | |

FOREIGN PATENT DOCUMENTS

| | | |
|---|---|---|
| CN | 101661592 A | 3/2010 |
| CN | 101836226 A | 9/2010 |
| CN | 101960479 A | 1/2011 |
| JP | 2004-054381 A | 2/2004 |
| JP | 2006-013971 A | 1/2006 |
| JP | 2008-243008 A | 10/2008 |
| JP | 2011-503701 A | 1/2011 |
| KR | 10-0749093 B1 | 8/2007 |
| WO | WO 2008094660 A1 | 8/2008 |

OTHER PUBLICATIONS

U.S. Appl. No. 13/018,716, filed Feb. 1, 2011 (copy not enclosed).
U.S. Appl. No. 13/019,061, filed Feb. 1, 2011 (copy not enclosed).
Mexican Institute of Industrial Property, Office Action, Mexican Patent Application No. MX/a/2013/010433, dated Mar. 12, 2015, eight pages.
Chinese First Office Action, Chinese Application No. 2012800133248, dated Nov. 3, 2015, 19 pages.
Japanese Office Action, Japanese Application No. 2013-558067, dated Feb. 2, 2016, 5 pages.
Korean Office Action, Korean Application No. 10-2013-7026716, dated Nov. 30, 2017, 12 pages.
Indian Office Action, Indian Application No. 6383/CHENP/2013, dated Mar. 29, 2019, 6 pages.
United States Decision on Appeal, U.S. Appl. No. 13/289,973, filed Nov. 16, 2017, 8 pages.
United States Decision on Appeal, U.S. Appl. No. 13/181,344, filed Nov. 21, 2018, 15 pages.
United States Decision on Appeal, U.S. Appl. No. 13/181,347, filed Jul. 5, 2019, 17 pages.

* cited by examiner

PRESENTING DEALS TO A USER OF SOCIAL NETWORKING SYSTEM

CROSS REFERENCES TO RELATED APPLICATIONS

This application claims the benefit of U.S. Provisional Patent Application No. 61/452,577 filed Mar. 14, 2011, which is incorporated by reference in its entirety.

BACKGROUND

This invention relates to deals in social networking systems, and in particular to suggesting deals of interest to users in a social networking system.

Providers of services and/or products offer deals to potential or current customers to entice them to make purchases. A deal is an offer to sell a product or service to a customer, oftentimes including a particular benefit available to customers who buy the product or service through the deal. For example, a deal may offer a product or service at a discounted price, such as a fixed percent of the original price or a fixed amount below the original price. A deal may offer a discount on a future purchase of a product/service upon a purchase of a similar or a different product/service. A deal may also offer access to inventory not open to the general population. For example, a deal may provide discount on a second product upon purchase of a first product. Deals are often offered by providers who are different from the actual seller of the product or service. The deal provider manages the deal purchase transaction and gives a voucher for the transaction to the customer, who can then redeem the voucher for the purchased product or service.

Providers offer deals for various reasons. Sometimes providers offer deals on products that they are trying to dispose of quickly to make room for a new line of products. Sometimes providers offer deals since they realize that users are interested in making a purchase only if there is a deal available. Users often closely monitor deals. Therefore deals draw attention of users to particular products and bring the product in their radar.

Providers are always coming up with creative ways to offer deals to get user's attention. However, if a user is not interested in a deal for a product or service, the efforts of the provider in directing these deals to the user get wasted. Therefore, providers prefer to direct their deals to users who are most likely to be interested in the deals offered in order to maximize sales of their products/services. Providers have not leveraged the power of social networking to make deals more effective to achieve their goals.

SUMMARY

Embodiments of the invention present deals of interest to a user of a social networking system based on social information associated with the user. Deals presented to the user are categorized based on social information associated with the user including actions taken by connections of the user. Deals that are closely associated with each other based on social information are presented together via a user interface. For a particular deal, social information relevant to that deal is presented, including connections associated with the deal, social groups, social events, images, as well as other deals.

In one embodiment, a request for presenting deals of interest to a user is received. Candidate deals are selected for presentation to the user. A set of the candidate deals is selected based on how well the selected deals match with one or more other users of the social networking system that are connected to the user being presented with deals. Information describing the selected candidate deals is sent to the user with instructions to present the deals together. In an embodiment, the deals are presented along with information describing the interactions between the other users with whom the user has established a connection and the candidate deals, for example, purchasing the deal, commenting on the deal, or liking the deal.

In an embodiment, the set of other users connected to the user comprises users connected to the user that are tagged together in a photo, users that are part of a social group, or users that attended an event together. In an embodiment, the candidate deals may be determined to match with the other users if the candidate deals match interests of the user or if the candidate deals match with actions performed by the other users. For example, users retrieving information related to sports may be matched with deals related to sports activities.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 3 is a user interface for allowing a user of a social networking system to interact with deals of interest to the user, in accordance with an embodiment of the invention.

FIG. 4 is a user interface for presenting social information associated with deals of interest to the user of a social networking system, in accordance with one embodiment of the invention.

Figure 1:
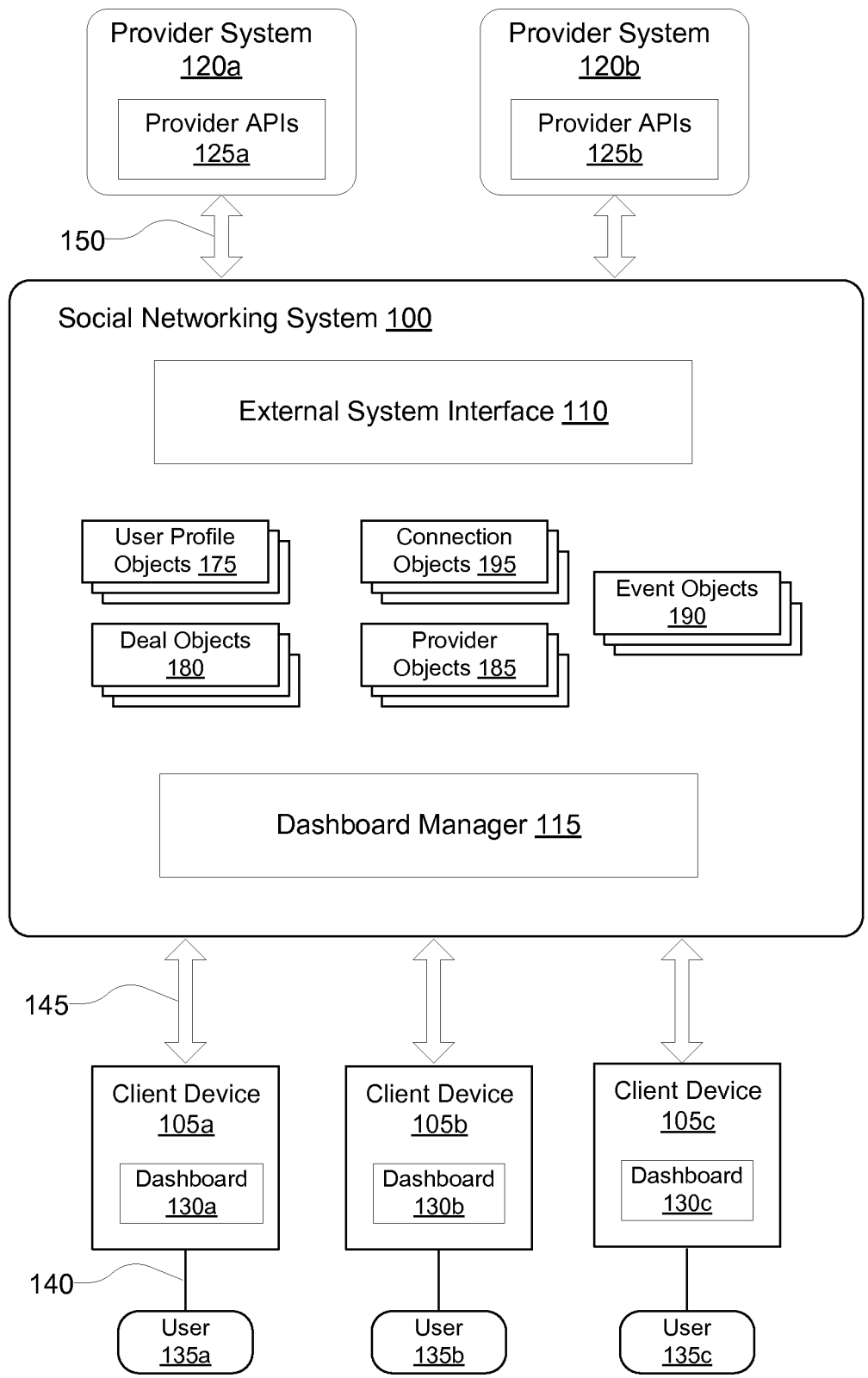
FIG. 1 is a diagram of a system environment for allowing users of a social networking system to interact with deals from providers, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments use social networking systems to incorporate social information of users to improve user interactions with deals. Incorporation of social information provides better experience for the users interacting with the deals which in turn results in more users getting interested in deals. This furthers the goals of the providers since the providers are attempting to increase the number of potential customers by offering deals. Besides, deals provide a social experience to the users and a valuable interaction with the social networking system. Users that find the social networking system valuable are more likely to be loyal to the social networking system. Increased loyalty of the users to the social networking system is likely to attract more providers offering advertisements and deals via the social networking system. Since social networking systems derive revenue from advertisements, this provides increased revenues for the social networking systems.

A user requesting information describing deals is presented with deals that are determined to be of interest to the user. The social networking system determines deals of interest to the user based on various criteria including information describing the user as well as information describing the connections of the user. The information describing the user and/or connections of the user considered includes actions performed by the user and/or the connections associated deals represented in the social networking system. The deals may be ranked based on their relevance to the user and presented to the user based on the ranking.

Social information relevant to a deal is presented to a user along with information describing the deal. Social information relevant to the deal includes connections of the user that performed actions related to the deal including purchasing the deal, commenting on the deal, or recommending the deal. Social information relevant to a deal also includes events, social groups, and images captured by friends of the user. For example, a photograph taken by a friend of the user at a restaurant may be presented when a deal from the restaurant is presented to the user. A user is more likely to pay attention to a deal if the user is presented with social information related to a deal along with information describing the deal.

Deals presented to a user are categorized based on social information describing the user. Deals that are related to each other based on a social context are presented together via a user interface. As a result, the user can relate the deals presented together and is provided with a social context in which to perform an action based on the deals. For example, a group of closely related friends may perform related actions associate with deals including going to concerts, movies, or attending other social events together. If the user is presented with the information describing deals related to these friends, the user is more likely to be interested in the deals and there is a better chance that the user might purchase a related deal.

Information Describing a Deal

A deal is associated with an offer made to a user that provides certain benefits to the user upon acceptance. The benefit offered by a deal corresponds to a value of the deal or a price of the deal. For example, a deal that offers higher benefits compared to other deals provides higher value compared to those deals. In an embodiment, a user can purchase a deal by paying a price for the deal. The user can subsequently redeem the deal by making a purchase or a transaction. Providers often present a deal to the users along with their advertisements. Typically, the benefits offered by a deal are associated with a transaction, for example, a purchase of a product or service offered by the provider. A transaction between a customer and a provider involves an exchange between a user and a provider, wherein the customer provides money to the provider and the provider provides one or more products and/or services to the customer. However a transaction involving a deal provides additional benefits to the user based on the deal.

Benefits offered by a deal can include a reduction in the price of the product and/or service. For example, the deal may offer reduction in price of a fixed percent (e.g., 10% reduction in price) or a reduction in price of a fixed amount (price reduced by ten dollars). Alternatively, the benefits provided by a deal may include other financial advantages including free shipping, a coupon for a subsequent purchase, a reduction in price of a different item bought in the same transaction, no sales tax, and the like. The benefits associated with a deal are referred to as the value of the deal or the price of the deal.

A deal may be associated with a time period. For example, a deal can only be used after a start date and before an end date. The deal may be associated with other limits on the purchases. For example, the deal may apply to all items purchased in a transaction, the deal may apply to all purchases made on a particular day, or the deal may apply to a single item. These limits on the purchases applicable to a deal are called the maximum redemption of the deal.

The deal may be associated with a location. For example, one location of a store may offer a deal but other locations may not. A deal may also be associated with an event. A deal may be applicable to in-store purchases as opposed to online purchases, or the deal may be for online purchases only. The deal may also have a specific redemption method. For example, the deal may require a user to present a coupon or a coupon code, the deal may be automatically offered upon making a purchase, the deal may require use of a particular type of payment mechanism including a specific type or credit or debit card, or the deal may require presentation of proof of membership in a club.

A deal may be associated with certain conditions, for example, the number of purchases made by the user must exceed a threshold value or the total value of the purchases must exceed an amount. When the required conditions associated with a deal are satisfied, the deal is considered activated. The activation of a deal may require an explicit status change by the provider of the deal. Alternatively, the activation may be automatic upon satisfaction of the required conditions and the user gets the benefits of the deal when the user completes an applicable transaction. The user may be required to complete a transaction associated with the purchase to redeem an activated deal.

Certain deals may be activated when a user is present at a certain location associated with a deal. For example, a deal may be activated when the user reaches the location of a restaurant. Alternatively, the deal may be activated when the user reaches a larger geographical area associated with the location of the provider. For example, a deal associated with a restaurant may be activated if the user reaches a mall or an airport in which the restaurant is located. Similarly, deals associated with providers located in a city may get activated for a user when the user is visiting the city. The location of a user may be detected by a device carried by the user, for example, with the help of a global positioning system (GPS), radio frequency identification (RFID) or explicitly identified by the user by checking-in to a location where the user is present or by tagging a photo with a business or location. A user can use the device to provide an indication to an online system informing the online system that the user has reached a location. A user providing input indicating that the user is present in a certain location is called checking-in to the location. The online system can send information to the provider indicating that the user is present at the location and the provider can activate the deal for the user.

Activating a deal comprises marking the deal as ready for use by a user. For example, a deal that is activated can be presented to the user as a coupon that can be redeemed by the user. An activation of a deal may require certain actions to be performed by multiple users. For example, the activation of a deal may require multiple users to be present at a location associated with the provider. If more than a threshold number of user's friends' check-in to a location along with the user, the deal is activated. Each user who participates in the activation of the deal is called a participant of the deal. The deal may offer benefits to one user or to all the participants of the deal. For example, a restaurant deal activated by a number of friends present at the location may offer a price reduction upon payment by a single user or it may offer price reduction to each participant making a separate payment. In an embodiment, activation of the deal comprises redemption of the deal. For example, if more than a threshold number of connections of a user purchase tickets for an event (for example, a concert) via the social networking system, a social deal provides the tickets at a discounted price. In this case, the activation of the deal happens when the deal is redeemed.

A reference to a deal in this disclosure may refer to an instance of deal associated with a particular user or a type of a deal offered by a provider. The context of the disclosure clarifies whether a deal refers to an instance of a deal or deals of a particular type. For example, a deal may refer to an offer by a particular provider that gives 20% discount on a product if purchased before a given date. A deal may also refer to an instance of a social deal that is specific to a user and requires participation by connections of the user.

Deals System Environment

FIG. 1 is a diagram of a system environment for allowing users of a social networking system to interact with deals using the social networking system, in accordance with an embodiment of the invention. The users 135 interact with the social networking system 100 using client devices 105. The provider systems 120 (also referred to as "provider" herein) interact with the social networking system 100 to provide information describing the deals. Some embodiments of the systems 100, 120, and 130 have different and/or other modules than the ones described herein, and the functions can be distributed among the modules in a different manner than described here.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

A provider system 120 comprises a provider application programming interface (API) module 125 that allows the social networking system 100 to interact with the provider system. In an embodiment, the provider APIs 125 may be implemented as a web service. The provider APIs 125 allow the social networking system 100 to send requests for information to the provider system 120 and receive information associated with the deals from the provider system 120. For example, the social networking system 100 may send a request to the provider system 120 to determine whether a user of the social networking system 100 is an existing customer of the provider system 120.

In one embodiment, the client device 105 used by a user 135 for interacting with the social networking system 100 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc.

The client device 105 executes a user interface called dashboard 130 to allow the user 135 to interact with the social networking system 100. The dashboard 130 allows the user 135 to perform various actions related to deals. These actions include retrieving information describing deals that are likely to be of interest to the user, recommending deals to connections of the user, participating in a deal, checking in to a location associated with a deal provider, and making a purchase using the deal. In an embodiment, the dashboard 130 is presented to the user via a browser application that allows a user to retrieve and present information from the internet or from a private network.

The social networking system 100 offers its users the ability to communicate and interact with other users of the social networking system 100. Users join the social networking system 100 and then add connections to a number of other users of the social networking system 100 to whom they desire to be connected. As used herein, the term "friend" refers to any other user to whom a user has formed a connection, association, or relationship via the social networking system 100. The term friend need not require that users to actually be friends in real life, (which would generally be the case when one of the members is a business or other entity); it simply implies a connection in the social networking system 100.

The social networking system 100 maintains different types of objects representing entities, for example, user profile objects 175, connection objects 195, event objects 190, deal objects 180, and provider objects 185. An object may be stored for each instance of the associated entity. A user profile object 175 stores information describing a user of the social networking system 100. A connection object 195 stores information describing relations between two users of the social networking system or in general any two entities represented in the social networking system 100. The event objects 190 store representations of real-world events in the social networking system 100. The deal objects 180 represent deals and the provider objects represent providers in the social networking system 100. These objects are further described in detail herein.

Figure 2:
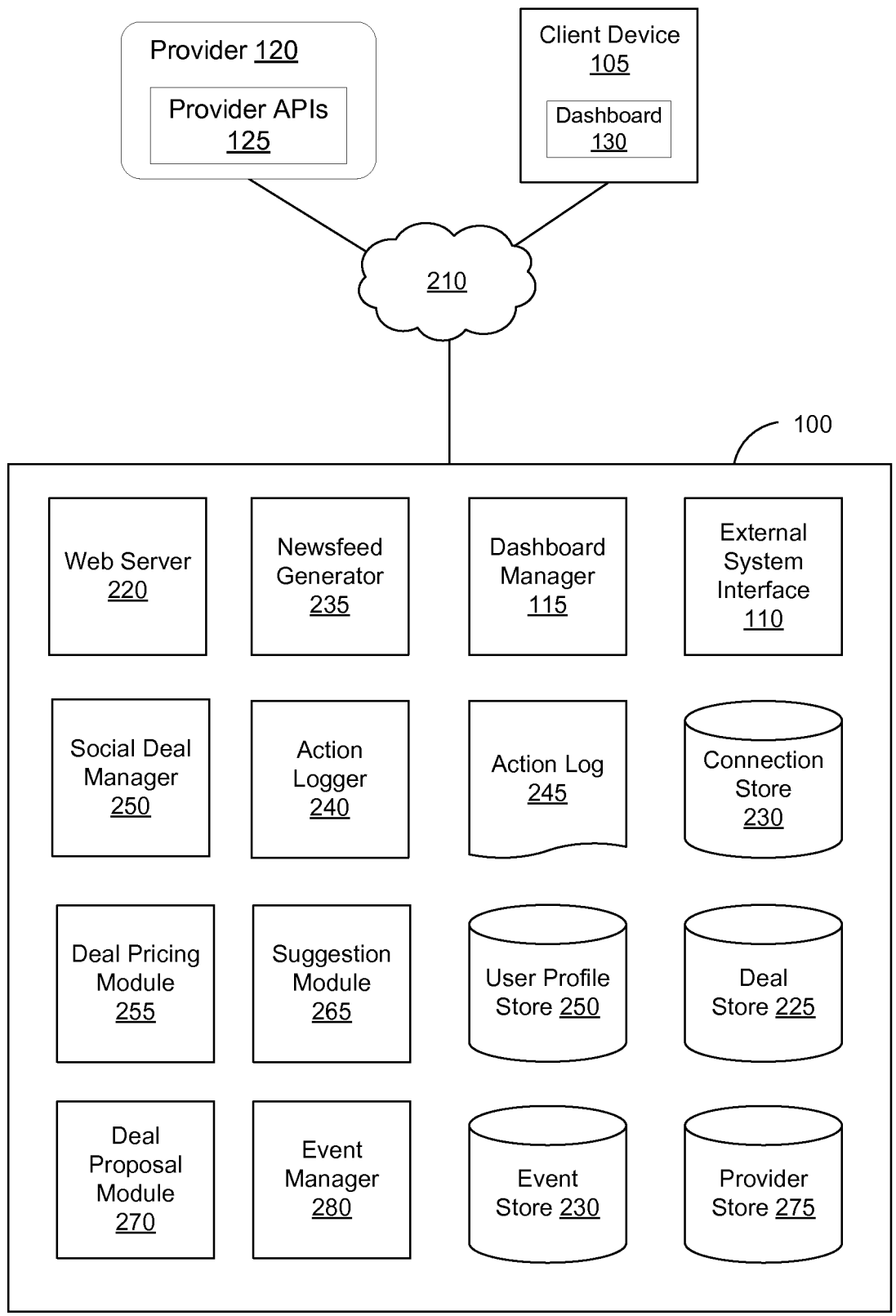
FIG. 2 is a diagram of the system architecture of a social networking system for allowing users of a social networking system to perform interactions with deals, in accordance with an embodiment of the invention.

The social networking system 100 comprises an external system interface 110, a dashboard manager 115 and various modules described in FIG. 2. The dashboard manager 115 allows users of the social networking system 100 to interact with the deals via the dashboard 130 user interface. The dashboard manager 115 presents information describing deals of interest to a user. For example, the dashboard manager may present different types of deals to two users that are interested in very different topics.

The dashboard manager 115 allows a user 135 to perform various actions associated with the deal. These actions include purchasing the deal, recommending the deal to a connection, commenting on the deal, following the deal, liking the deal, participating in a social deal, uploading an image associated with the deal, for example, uploading an image taken at a location associated with the deal for display as part of the user's profile. A user purchases a deal by completing a transaction that takes advantage of the deal. For example, if the deal offers a 20% discount on purchase of a product, the user purchases the deal by purchasing the product and redeeming the deal for the purchase.

The dashboard manager 115 receives requests from the user 135 for performing actions related to deals. A user 135 sends requests to the dashboard manager 115 via the dashboard 130. For example, a user 135a may send a request to recommend a deal to a connection of the user 135a (say, user 135b). The dashboard manager 115 may invoke other modules of the social networking system 100 shown in FIG. 2 to perform a requested action.

The external systems interface 110 of the social networking system 100 allows various modules of the social networking system 100 to interact with external systems including the provider systems 120. For example, a module of the social networking system 100 may update the provider system 120 with information describing a transaction made by a user 135. The external system interface 110 invokes the provider APIs 125 for interacting with the provider systems 120. The external systems interface 110 also allows external systems to interact with the social networking system 100, for example, to access the social network information or to update information present in the social networking system 100. The external system interface 110 provides APIs that allow external systems to interact with the social networking system 100. For example, a provider system 120 may send information describing new deals from the provider by invoking appropriate APIs supported by the external systems interface 110. The requests received from external systems are authenticated by the social networking system 100 to ensure that the external system has permissions to perform the requested actions.

The social networking system 100 comprises modules other than those shown in FIG. 1, for example, modules illustrated in FIG. 2 that are further described herein.

Social Networking System Architecture

FIG. 2 is a diagram of system architecture of a social networking system 100 for allowing users to interact with deals, in accordance with an embodiment of the invention. The social networking system 100 includes a web server 220, a newsfeed generator 235, a dashboard manager 115, an external system interface 110, an action logger 240, an action log 245, a deal pricing module 255, suggestion module 265, a deal proposal module 270, an event manager 280, a user profile store 285, a connection store 230, a deal store 225, an event store 260, and a provider store 275. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 allows users to communicate or otherwise interact with each other and access content, as described herein. The social networking system 100 stores user profile objects 175 in the user profile store 285. The information stored in user profile store 285 describes the users of the social networking system 100, including biographic, demographic, and other types of descriptive information, such as work experience, educational history, gender, sexual preferences, hobbies or preferences, location, and the like. The user profile store 285 may also store information provided by the user, for example, images, videos, comments, and status updates. Images of users may be tagged with the identification information of the appropriate users displayed in an image.

Any action that a particular user takes using the social networking system 100 is associated with the user's profile 175, through information maintained in a database or other data repository. Such actions may include, for example, adding a connection to the other user, sending a message to the other user, reading a message from the other user, viewing content associated with the other user, seeing what deals another user likes or is following, attending an event posted by another user, among others. In addition, a number of actions described below in connection with other objects are directed at particular users, so these actions are associated with those users as well.

The connection store 230 stores data describing the connections between different users of the social networking system 100, for example as represented in a connection object 195. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking site based on common characteristics of the users (e.g., users who are alumni of the same educational institution). For example, if Bob and Joe are both connected to each other in the social networking system 100, Bob and Joe, both users, are also each other's friends. The connection between users may be a direct connection; however, some embodiments of a social networking system 100 allow the connection to be indirect via one or more levels of connections.

The deal store 225 stores information describing deals, for example, deals represented as deal objects 180. The deal object 180 is associated with metadata describing the deal and comprises data specific to an instance of the deal. An instance of a deal may be created for each user that performs certain actions associated with the deal. For example, if the activation of a deal requires participation by connections of a user, the deal object 180 stores information describing the participants in the deal. As other connections of the user perform actions that contribute towards activation of the deal, the social networking system 100 updates the information stored in the deal object 180.

The information stored in a deal object 180 can comprise a description of the deal, one or more deadlines associated with the deal, for example, a start date and end date during which the deal can be used, a location associated with the deal, a type of the deal, a redemption method for the deal, maximum redemption associated with the deal, a description of the benefit offered by the deal, for example, a percent reduction in price, any conditions or rules associated with the deal, a profile page associated with the deal on the social networking system 100, and other information. The deal object also stores information identifying the deal provider 120, a user associated with the deal, and one or more connections of the user that may be associated with the deal if the deal activation requires participation by connections of the user. The deal object 180 may store information describing a source of the deal, for example, whether the deal was imported from an external system, or the deal was added to the social networking system 100 by the deal provider 120, or if the deal was initiated by a user of the social networking system 100. The deal object 180 may be associated with actions of users associated with the deal, for example, users that liked the deal or are following the deal, users who subscribed to the deal, users who purchased the deal, users who shared or gifted the deal, users who checked-in to locations associated with the deal, comments made by users on the deal etc. A deal object may store information specific to a particular user, for example, information identifying a user associated with the deal, connections of the user that are participating in the deal, etc.

A deal store 225 also stores a category associated with each deal that describes the type of product or services associated with the deal. Examples of categories of deals include "dining," "shopping," "professional services," "beauty and spas," "health and fitness," "automotive," "pet care," "financial services," "travel," and "arts and entertainment." In an embodiment, the social networking system 100 may have a list of business categories defined to classify various businesses. The social networking system 100 stores a mapping from the business categories to the deal categories to allow objects based on business categories to be matched with deal categories. For example, business categories "restaurant" and "bar" map to the deal category "dining." Similarly, business categories "hotel," "airport," and "transit stop" map to deal category "travel."

A deal object may be associated with different types of social information including various users of the social networking system 100, events represented in the social networking system 100, actions associated with the deal by users, and the like. This information may be stored in various data stores in the social networking system 100. Associations between the deal objects 180 and the relevant social information associated with the deal may be either stored explicitly in the social networking system 100 or determined as needed.

The event store 260 stores information describing events associated with the social networking system 100. An event object 190 may be defined for a real-world event, such as a birthday party. A user interested in attending the event may establish a connection with the event object. A user may create the event object 190 by defining information about the event such as the time and place and a list of invitees. Other users may send a reply to the invitation (an RSVP message) i.e., accept or reject the invitation, comment on the event, post their own content (e.g., pictures from the event), and perform any other actions enabled by the social networking system 100 for the event 185. Accordingly, the creator of the event object 190 as well as the invitees for the event may perform various actions that are associated with that event object 190. Certain events may be associated with deals, for example, an event object may represent a concert and a deal may provide a discounted price for the concert. The event store 260 stores the associations between events and deals.

The provider store 275 stores the provider objects 185 that store information describing the providers 120. The information describing a provider 120 includes categories associated with products/services offered by the provider, locations associated with the provider, and information needed for interacting with the provider APIs 125. In an embodiment, the provider object 185 locally caches information describing the provider that is frequently used by the social networking system 100. The locally cached information is synchronized with the information stored in the provider system 120 based on criteria, for example, based on a regular schedule, or every time the information stored in the provider system 120 changes. The social networking system 100 stores associations between the provider objects 185 and the deals provided by the provider 120.

The web server 220 links the social networking system 100 via the network 210 to one or more client devices 105; the web server 220 serves web pages, as well as other web-related content, such as Flash, XML, and so forth. The web server 220 provides the functionality of receiving and routing messages between the social networking system 100 and the client devices 105. These messages can be instant messages, queued messages (e.g., email), text and SMS (short message service) messages, or any other suitable messaging technique.

The action logger 240 is capable of receiving communications from the web server 220 about user actions on and/or off the social networking system 100. The action logger 240 populates the action log 245 with information about user actions to track them. Any action that a particular user takes with respect to another user is associated with each user's profile, through information maintained in a database or other data repository, such as the action log 245. Such actions may include, for example, adding a connection to the other user, sending a message to the other user, reading a message from the other user, viewing content associated with the other user, attending an event posted by another user, among others.

The dashboard manager 115 performs categorization of deals based on various kinds of social information associated with the user including connections of the user, social groups associated with the user, events, interactions between the connections. The dashboard manager 115 categorizes sets of deals together if the deals are associated with each other via related social information. For example, several pairs of deals associated with each other via connections of the user may be grouped together if the corresponding connections are determined to have high affinity with each other.

Figure 3:
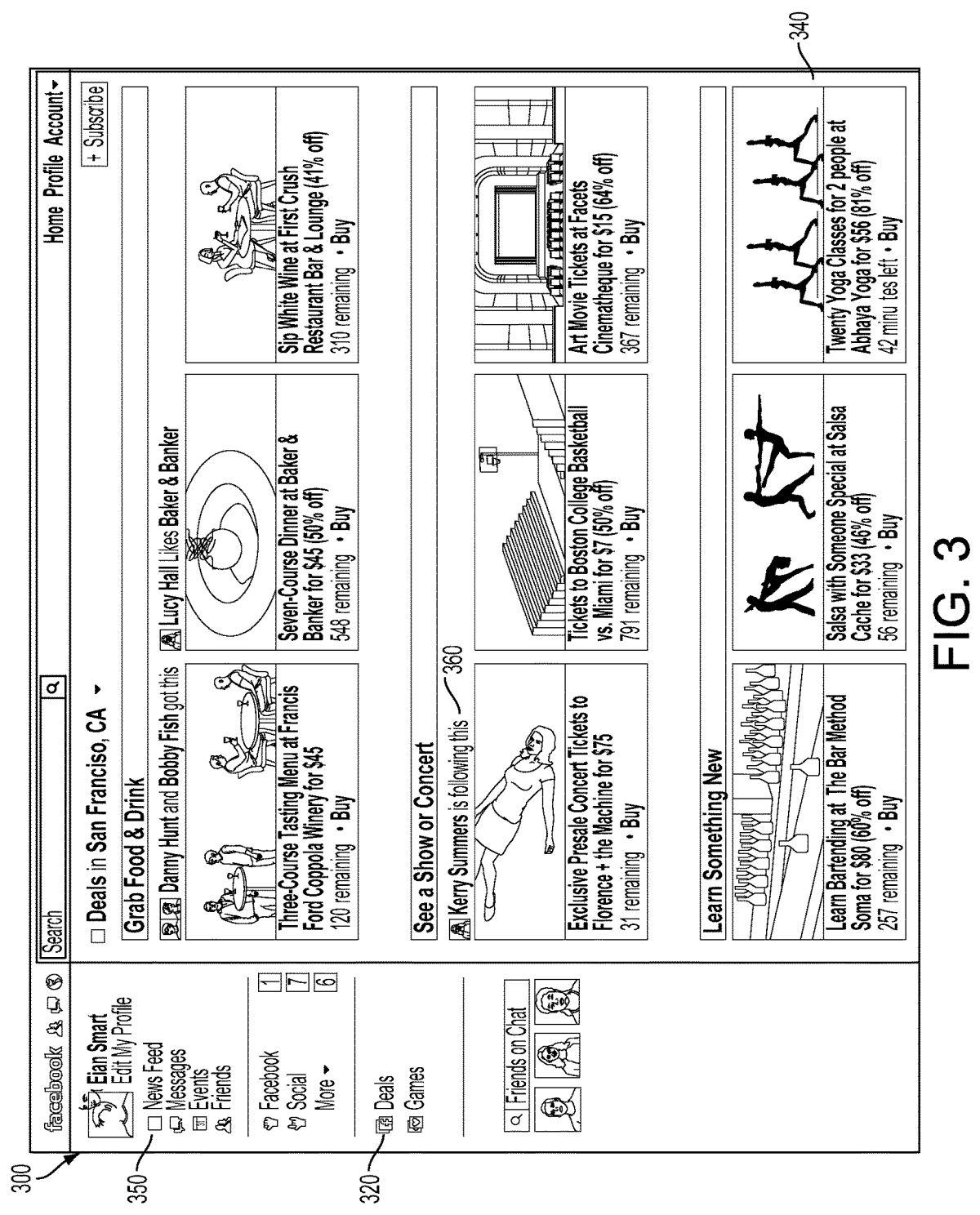

The suggestion module 265 determines the deals of interest for a given user of the social networking system 100. In an embodiment, the user sends a request to receive deals of interest to the user via the dashboard 130 user interface. FIG. 3 illustrates a user interface for allowing user to request information 320 describing the deals relevant to the user. The dashboard manager 115 receives the request from the user and sends a request to the suggestion module 265 to suggest deals for the user. The suggestion module 265 uses information associated with the user stored in the social networking system 100 including social information to determine deals relevant to the user.

In an embodiment, the suggestion module 265 determines social information associated with the deal for presentation to the user. The user may request information describing the deal using the dashboard 130. The suggestion module 265 determines social information relevant to the deal for the user and sends the information to the dashboard manager 115. The dashboard manager 115 presents the information to the user 135 via the dashboard 130. The dashboard manager 115 can also present the information to the user via other mechanisms provided by the social networking system 100, for example, via various communication channels including email, newsfeeds, wall posts, notifications, mobile notifications, etc. or via a third party website, or as an information bar along with the user interface of the social networking system 100.

The interactions between the client devices 105 and the social networking system 100 as well as the interactions between the provider 120 and the social networking system 100 are typically performed via a network 210, for example, via the internet. The network 210 enables communications between the client device 220 and the social networking system 210.

Deals Dashboard

The dashboard 130 provides a user interface for allowing a user of a social networking system to view and interact with deals. FIGS. 3(a) and 3(b) show screenshots of the dashboard, in accordance with an embodiment of the invention. The dashboard 130 can be a part of a user interface that allows various types of user interactions with a social networking system 100. A user viewing the user's information 300 on a social networking system 100 (for example, from the user's home page) can request different type of information from the social networking system 100 by pressing buttons or links 350. The different types of information requested by the user include newsfeed stories of interest to the user, messages received by the user via the social networking system 100, connections of the user, events associated with the user, and the like. The user can also request information describing deals associated with the user clicking on button 320. The dashboard 130 user interface is presented to a user requesting deals information by clicking on the button 320.

When a user requests deals information, the dashboard manager 115 receives deals relevant to the user as suggested by the suggestion module 265. The suggestion module 265 ranks various deals 340 based on their relevance to a user to select deals for suggestion to the user. In an embodiment, a deal determined to have higher relevance with respect to the user may be presented more prominently compared to another deal determined to lave lower relevance. The deals presented to the user may be categorized based on social information associated with the user. For example, deals of a subset of connections of the user that have high affinity with each other may be presented together. A deal may be presented along with information describing actions of the user's connections associated with the deal.

Figure 4:
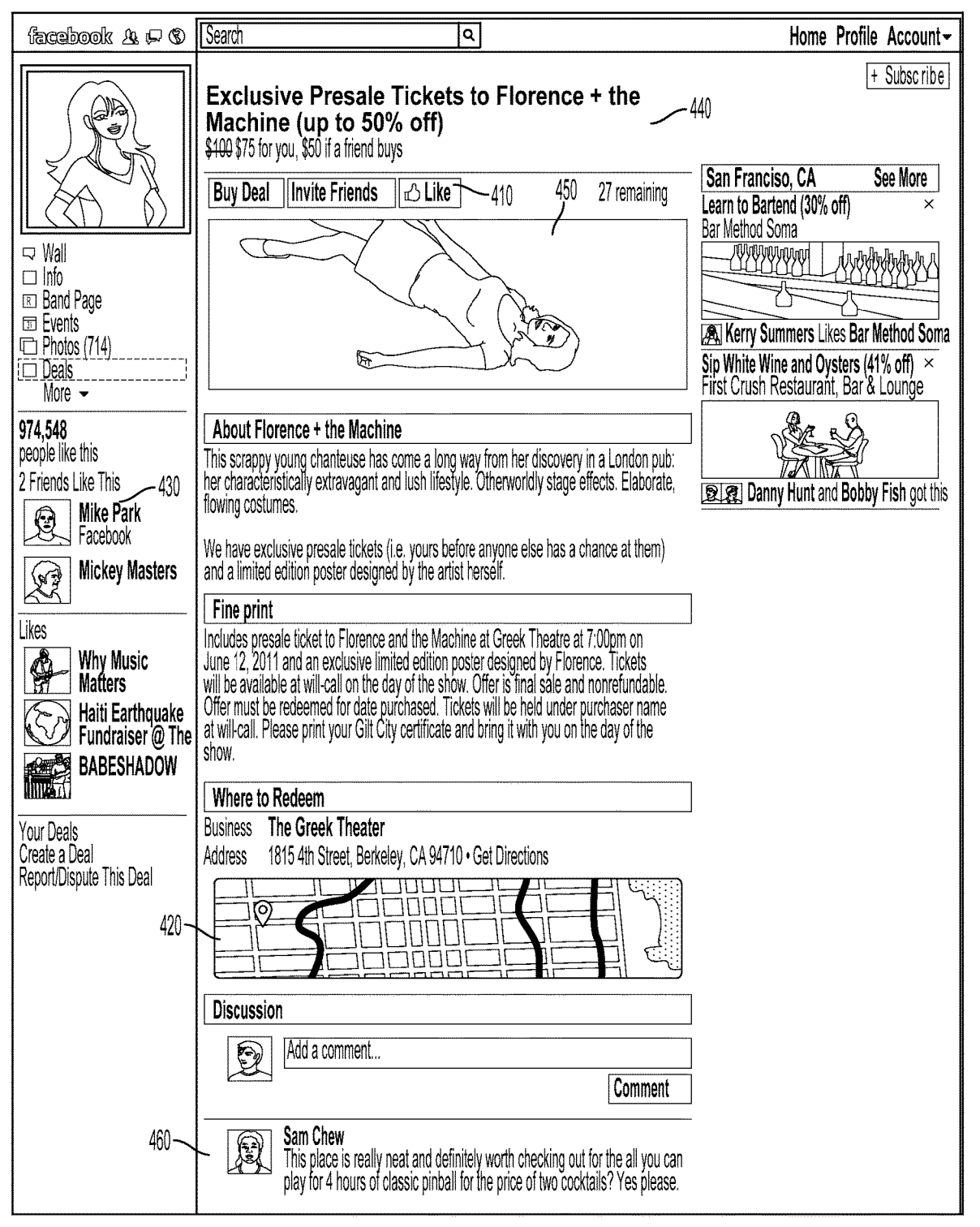

A user can select a particular deal 340 presented to the user and request more information describing the deal. FIGS. 4(a) and 4(b) show screenshots of a user interface presenting social information associated with a particular deal selected by the user. FIG. 4 shows detailed information describing the deal, for example, the location 420 of the deal, the deal price 440, and images 450 describing the product/services associated with the deal. The user interface presented in FIG. 4 allows user actions 410 associated with the deal including purchasing the deal, recommending the deal to a connection, commenting on the deal, liking the deal, participating in a social deal, uploading an image associated with the deal and the like. FIG. 4 shows comments related to the deal added by other users of the social networking system 100, for example, the user's connections. The dashboard 130 may also present different types of social information associated with the deal, for example, connections 430 of the user that performed an action associated with the deal, events associated with the deal, social groups associated with the deal, images associated with the deal and the like.

Figure 5:
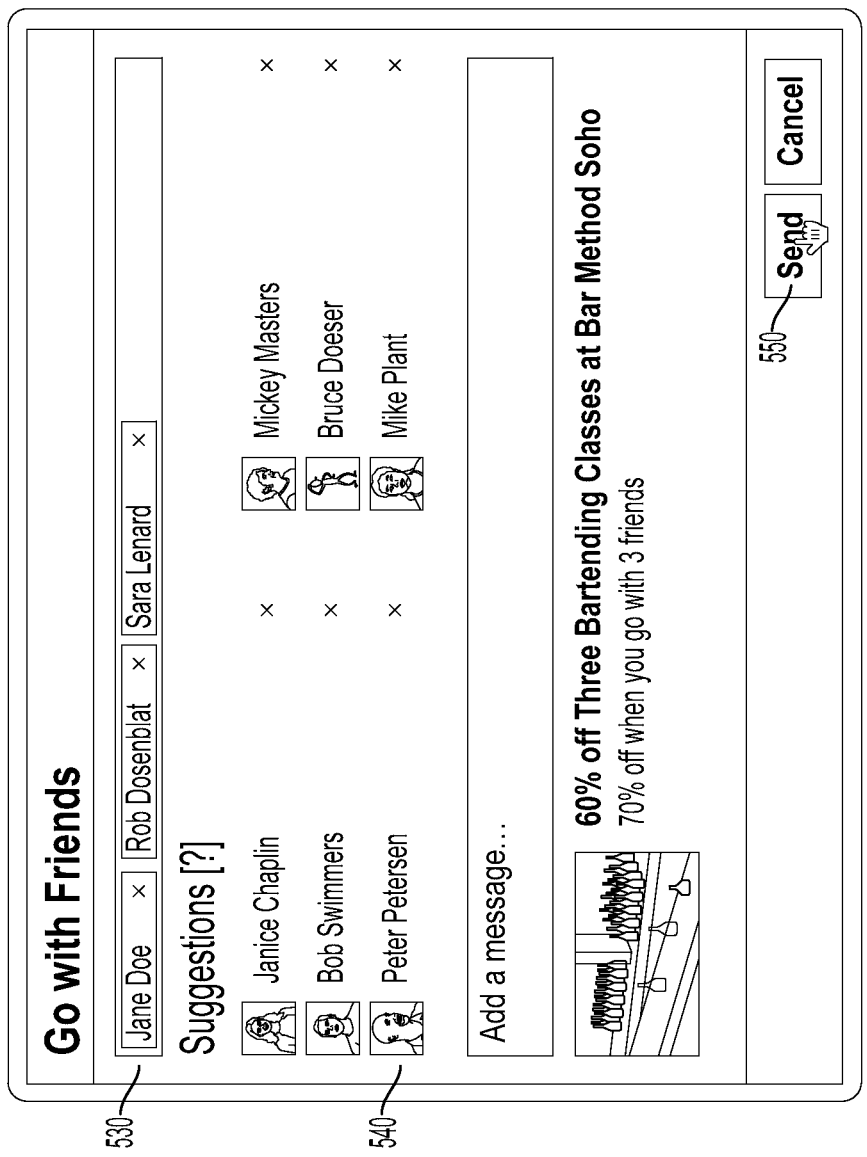
FIG. 5 shows a screenshot of a user interface displaying connections of a user of the social networking system that are likely to be interested in a deal, in accordance with one embodiment of the invention.

The social networking system 100 may request the user to perform certain actions associated with the deal. For example, the social networking system 100 may request the user to suggest the deal to the user's connections. FIGS. 5(a) and 5(b) show screenshots of a user interface displaying connections 510 of a user of the social networking system 100 that are likely to be interested in a deal, in accordance with one embodiment of the invention. Typically, a user is presented with a request for suggesting the deal to the user's connections when the user purchases the deal. For example, the screens shown in FIG. 5 may be presented as part of the user interaction with the social networking system 100 for making the purchase. The connections of a user that are likely to be interested in a deal are determined by the suggestion module 265 based on various factors describing the connections, for example, interests of the connections, past actions of the connections, a degree of interactions between the user and the connections and the like. The user interface shown in FIG. 5(a) allows the user to select 520 one or more of the suggested connections 430 and recommend the deal to the selected connections 430. The social networking system 100 may send a message to the selected connections 430 on behalf of the user, informing them that the user recommends the deal to them. The user interface in FIG. 5(b) allows a user to add 540 connections to a list for suggesting the deal. The user can delete 530 connections previously added to the list. Once the required connections are added to the list, the user can send 550 the information describing the deal to the connections.

Certain actions of the user may provide negative feedback associated with the deal from the user. For example, if a user hides the deal or removes the deal from the dashboard, the user is assumed to dislike the deal or the user is not interested in the deal. Alternatively, the user may provide negative feedback by explicitly providing a low rating for the deal. The user can also provide negative feedback in text form by providing negative comments on the deal. The type of feedback provided textually by a user via comments can be determined by performing textual analysis of the comment, for example, sentiment analysis.

The FIGS. 3, 4, and 5 show a dashboard user interface associated with the social networking system 100 for presenting information associated with deals. However information describing deals including deal suggestions, social information associated with deals etc. can be presented by various mechanisms by a social networking system 100. For example, deals information can be presented in a side bar, in various contexts in a user interface of the social networking system 100 including a user profile page, via notifications through various communication channels including newsfeed, email, via user defined applications, and so on. A third party system, for example, a third party website can connect with the social networking system 100 using APIs defined by the external systems interface 110 to retrieve information describing deals and present them in a user interface of the third party website.

Suggesting Deals

The social networking system 100 presents deals to a user that the user is likely to be interested in. The social networking system uses social information associated with a user to determine deals that the user is most likely to respond to. A user may respond to a deal by purchasing the deal or by performing actions related to the deals, for example, recommending the deal to a friend or commenting on the deal. These deals are presented to the user via the dashboard 130 or any other user interface associated with the social networking system 100.

The suggestion module 265 selects deals for suggestion to the user. The suggestion module 265 may filter deals for suggestion to a user based on targeting criteria provided by the providers 120. The targeting criteria from a provider indicate categories of users that the provider is interested in targeting. The targeting criteria may be specified by the provider based on information describing the users, for example, user's interests, friends' information, purchase history or demographic information of the users including gender, age, income, geographical location, or education. For example, a provider of clothing may target a deal for women's clothing by specifying the gender as female, a particular range of age and a geographical location of a city. Similarly, a provider of motorcycles may offer a deal targeted towards men of age within given range, having income above a threshold value. The targeting criteria provided by a provider 120 may be stored in the provider store 275 as part of one or more provider objects 185 describing the provider 120. The provider store 275 may also store associations between the targeting criteria and corresponding deal objects 180 stored in the deal store 225.

In an embodiment, a provider is allowed to specify targeting criteria based on social information associated with the user. For example, the provider can specify that a criterion for targeting the deal is that the user should have more than a threshold number of connections that are interested in a particular topic. The provider can specify the deal targeting criterion based on the total number of connections, for example, the deals should be targeted to users that have more than a specified number of friends. The provider can also target deals based on information associated with connections of the user. For example, a provider can target deals to users that have at least a family member below a certain age, for example, a toddler. Or the provider can target deals to users that have one or more family members above certain age or in a specified age range.

Figure 6:
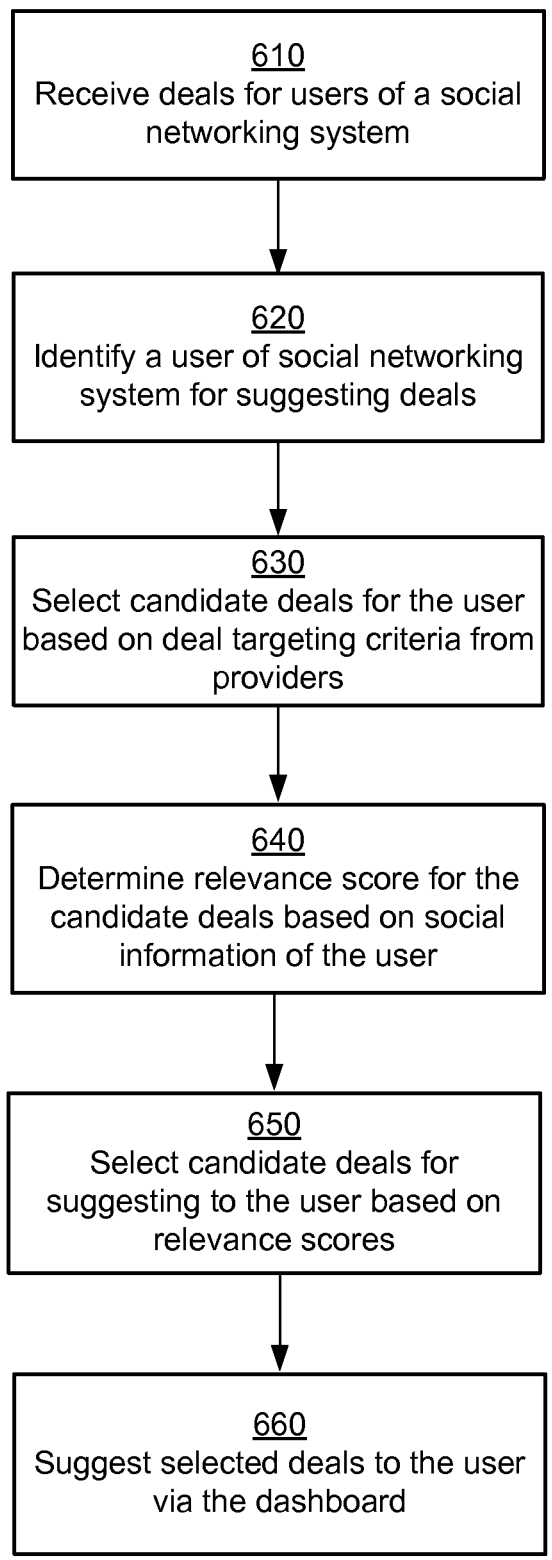
FIG. 6 is a flowchart of a process for determining deals that are likely to be of interest to a user of the social networking system, in accordance with one embodiment of the invention.

FIG. 6 shows a flowchart of a process for determining deals that are likely to be of interest to a user of the social networking system. The social networking system 100 receives 610 a number of deals from the providers. The deals may be provided by the provider systems 120 by using the external system interface 110. The suggestion module 265 identifies 620 a user for suggesting the deals. The suggestion module 265 compares information describing the user with targeting criteria provided by the providers to determine whether the user's profile fits a category of users targeted by the provider. This allows the suggestion module to select 630 candidate deals that are targeted towards the user.

The suggestion module 265 determines a measure of relevance of each candidate deal targeted towards the user. The suggestion module 265 selects a set of candidate deals for presentation to the user based on the measure of relevance of the candidate deals with respect to the user. The suggestion module 265 provides the information describing the selected candidate deals to the dashboard manager 115. The dashboard manager suggests 660 the selected deals to the user by presenting the deals to the user via the dashboard 130.

The measure of relevance of a deal with respect to the user is determined 640 based on various factors including information associated with connections of the user. The information associated with a connection includes information describing the connection stored in the user profile and information describing past actions of the connection. The past actions of connections may be stored in action logs 245. Furthermore, the information describing a connection may recursively include information describing the connections of the connection. The actions used for determining the relevance score include action performed by the connections associated with deals that are similar to the deal being analyzed, for example, deals belonging to the same deal category. These actions include, the connection suggesting the deal to the user, purchasing a deal, liking the deal, commenting on a deal, following the deal, suggesting the deal to other users, sharing information describing the deal on the connections wall, checking in to a location associated with the deal and the like. Certain actions associated with the deal may be weighted more than other actions for determining a relevance score for a deal with respect to a user. For example, an action indicating the connection explicitly sent a request recommending the deal to the user may be weighted more than actions including the connection commenting on the deal or liking the deal. An action indicating the connection purchased a deal may be weighted more than the connection commenting on the deal. An action indicating checking in to a location associated with the deal may be weighted more than commenting on a deal. Similarly commenting on a deal weighted more than liking a deal.

In an embodiment, the suggestion module 265 determines a relevance score for a deal based on real-life events associated with the connections of the user or real-life events associated with the user. A connection of the user or the user can be determined as having a real-life event, for example, a wedding, a birthday, a festival, a child birth, or an anniversary that is expected to occur in the near future. As an example, if a connection of a user is determined as having a child birth in the family, the user may be presented with deals relevant to a baby shower or child birth. Deals that are valid within a time range of the event may be determined to be relevant to the user and suggested. Communications between the user and the connection or between a connection and other users may be used to determine the occurrence of the event for the connection and also a level of enthusiasm of the connection in the event. For example, a connection mentioning an event frequently in communications may be determined to be more enthusiastic about the event. The level of enthusiasm of a connection of a user in an event may be used as a factor in determining relevance of a deal associated with the event for the user.

Other factors used for determining the measure of relevance of a deal with respect to the user include information associated with the user. The information associated with the user is determined similar to the information associated with the connections described above. For example, the information associated with the user may include information describing the user obtained from the user profile or determined based on actions performed by the user in the social networking system 100. The actions performed by the user used for determining a measure of relevance of the deal are processed similar to the actions performed by connections of the user described above.

The actions of a connection of a user can be weighted based on a measure of affinity between the connection and the user for determining a relevance score of a deal with respect to the user. For example actions of connections of the user that interact frequently with the user are weighted more than actions of connections of the user that interact rarely with the user. The actions of a connection of a user (or the user) may also be weighted based on an age associated with the actions. For example, actions that occurred a long time ago may be weighted less compared to recent actions of the connections.

The measure of relevance of a deal with respect to a user may be determined by the rate at which the user or the user's connections have purchased deals belonging to the category of the current deal in the past. For example, if the user or the user's connections have frequently bought deals of a particular category, the user may be suggested deals belonging to the category. The measure of relevance of a deal may be determined based on the number of connections of the user. For example, if a deal requires participation by more than a threshold number of connections of the user, the measure of relevance of the deal can be determined based on the number of connections of the user determined to be interested in the deal.

In an embodiment, a third party system, for example, a third party website connects with the social networking system 100 using APIs defined by the external systems interface 110. The social networking system 100 can present deal information on the third party website. For example, the social networking system 100 may provide the requested social information in exchange for the third party allowing deals related information to be presented in the user interface of the third party system. In this embodiment, the suggestion module 265 receives information describing the third party system that is interacting with the social networking system 100. The information describing the third party system is used to determine a context in which the third party system is requesting information. The context may be determined by the type of products, services or business provided by the third party. For example, a third party website may provide sports related information, health information, or diet information. The suggestion module uses the information describing the context of the third party website as a factor in determining the deals to be suggested to the user via the third party website. The suggestion module 265 can match keywords or topics associated with the third party system with the categories associated with deals to determine deals to be suggested to the user. The context may be determined from a portion of the third party system. For example, if a user is viewing a third party website providing news the user may view different sections including, sports, travel, health, etc. The information describing the deals suggested to the user via the third party system can be determined based on the portion of the news website that the user is currently viewing. For example, if the user is viewing sports section of the news, the user can be suggested deals associated with sports, if the user is viewing health information, the user can be suggested deals related to health products and services and so on.

Presenting Social Information Relevant to a Deal

When a user is presented with information describing a deal, the user may be presented with relevant social information associated with the deal. Social information relevant to the deal includes information describing connections of the user, actions related to the deal performed by the connections, events related to the deal, social groups associated with the deal, other deals associated with the deal, or images associated with the deal. A user is more likely to be interested in a deal if the user knows that connections of the user performed actions related to the deals. The actions of the connections of the user can include a connection purchasing the deal, commenting on the deal, following a deal, subscribing to a deal, liking the deal, liking a webpage associated with the deal, checking in to a location associated with the deal, or suggesting the deal to another user.

FIG. 4 shows the screenshot of a user interface presenting a deal to a user along with information 430 describing connections of the user associated with the deal. Information describing connections of the user is presented based on a measure of relevance of the connection with respect to the deal. The relevance of a connection with respect to a deal is determined based on various factors associated with the connection. For example, the relevance of a connection with respect to a deal may be determined based on a degree of match between the interests of the connection and information describing the deal. Information describing a deal can comprise the category of the deal, key words associated with the deal, or interests of other users that perform actions related to the deal. The interests of the connections may be explicitly specified by the connection in the connection's user profile or may be derived from past actions performed by the connections. Relevance of a connection with respect to a deal can be determined based on past actions of the connection associated with similar deals, including, deals belonging to the same category or deals from the same provider. For example, if several connections of a user purchase deals from a provider, the user is also likely to be interested in deals from the provider. Actions of a user associated with a deal include purchasing a deal, liking a deal, commenting on a deal, suggesting the deal to other users, recommending the deal, checking in to a location associated with the deal, communications with the user describing the deal, and the like. Actions performed by a user may be weighted based on an age of the action, for example, older actions may be weighted less than newer actions.

Certain actions associated with the deal may be weighted more than other actions for determining a relevance of a connection with respect to the deal. For example, purchasing a deal is considered more significant that commenting on the deal and is weighted higher. Similarly, checking in to a location associated with a deal may be weighted more than commenting on the deal. Commenting on the deal may be weighted more than liking the deal. In an embodiment, actions that are directly related to the deal being presented are determined to be more relevant that actions associated with other deals.

The relevance of a connection of a user with respect to a deal may also be weighted by the affinity of the connection with respect to the user. The affinity of the connection is measured based on the type of interactions between the user and the connection, the type of connection (for example, family, friend, or colleague), frequency of interactions between the user and the connections and the like.

The connections presented along with the deal may be filtered based on the targeting criteria provided by the provider. This filtering is performed because the provider has determined that connections satisfying the deal targeting criteria are likely to be associated with the deal. For example, if the provider indicates that the deal is targeted towards users of particular demographic characteristics including age, gender, or income, only connections satisfying the targeting criteria are presented along with the deal.

The suggestion module 265 may suggest different types of social information to a user along with information describing a deal. Social information associated with the deal includes events associated with the deal that the user is determined to be interested in. For example, a deal for a restaurant may be presented along with a concert taking place in a location near the restaurant if the user is determined to be interested in the concert. The user may be determined to be interested in the concert if the user retrieved information describing the concert, liked an event describing the concert in the social networking system 100, or previously attended similar concerts. The deal may be presented to the user along with other associated deals. In the above example of a concert happening close to a restaurant, the user may be presented with a deal for the restaurant when the user requests for information on a deal for the concert or vice versa.

The suggestion module 265 may suggest information describing social groups associated with a deal for presentation to the user along with the deal. For example, if a user is presented with a deal for a fitness club, the user may also be presented with information describing activities of a fitness group of the social networking system. The fitness group may be a social group associated with activities performed by connections of the user. For example, the user may be presented with statistics describing how many members of the fitness group are also members of the fitness club. Similarly, an event organized by members of the group at the fitness club may be presented to the user.

The suggestion module 265 may present images associated with the deal that are captured by connections of the user and uploaded to the social networking system by the connections. For example, if the user requests information describing a restaurant deal, images associated with the restaurant captured by friends of the user may be presented to the user. The images may show the restaurant, dishes served by the restaurant, or locations close to the restaurant. The locations of the images can be determined based on information provided by the user or by metadata obtained from the images. For example, certain digital cameras are occupied with a global positioning system (GPS) and provide the location of an image along with metadata of the image. The distance of the location at which the image was captured can be determined from the location of the restaurant. If the location at which the image was captured is determined to be within a threshold distance from the location of the restaurant, the image is presented to the user along with deals of the restaurant.

Figure 7:
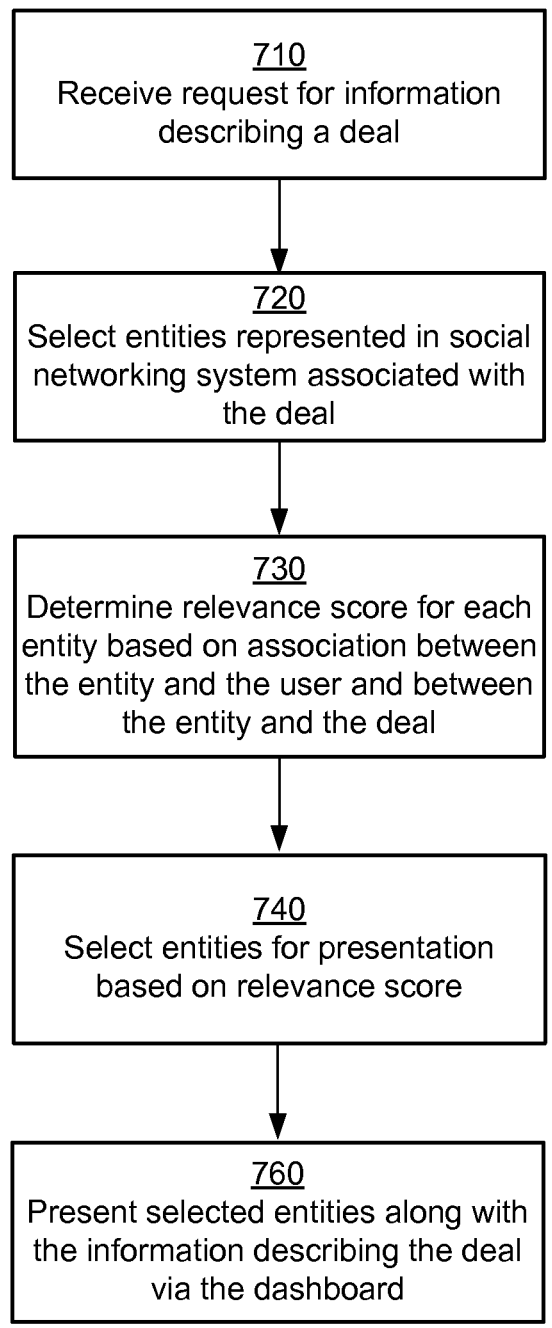
FIG. 7 is a flowchart of a process for presenting social information along with information describing a deal to a user of the social networking system, in accordance with one embodiment of the invention.

FIG. 7 shows a flowchart of a process for presenting social information along with information describing a deal to a user of the social networking system, in accordance with one embodiment of the invention. The suggestion module 265 receives 710 a request for information describing a deal from a user. The user may request information about a particular deal using the dashboard 130. The request for information sent by the user is received by the dashboard manager 115. The dashboard manager 115 sends a request to the suggestion module 265 to provide information associated with the deal that is relevant to the user. The suggestion module 265 selects 720 entities represented in the social networking system 100 that are relevant to the deal. The suggestion module 265 determines 730 relevance score for the selected entities. The relevance score can be determined based on factors including information describing associations between the entity and the deal and information describing associations between the entity and the user. The suggestion module 265 selects 740 entities for presentation to the user based on the relevance scores. The suggestion module 265 sends the information describing the entities to the dashboard manager 115. The dashboard manager 115 sends the relevant social information for presentation 760 to the user along with information describing the deal.

Categorizing Deals Based on Social Information

If a large number of candidate deals are selected for presentation to a target user, the dashboard manager 115 categorizes the deals based on social information associated with the user. Deals determined to be closely associated with each other are presented together via the dashboard 130. Two deals may be determined to be associated with each other if they are both associated with an entity represented in the social networking system. For example, two deals may be associated with each other if they are both associated with a connection of the target user. Alternatively, two deals may be associated with each other if each deal is associated with a connection of the user and the connections are determined to have high affinity with each other.

As another example, the connections of the target user in the social networking system 100 can be analyzed to determine friend circles. Each friend circle comprises a set of connections with high affinity with each other. Deals associated a set of connections belonging to a friend circle may be determined to be associated with each other and presented together via the dashboard 130. Examples of friend circles of a user include a set of connections graduating from the same school, a set of connections that are members of a social group, a set of connections comprising people of similar interests, a set of connections comprising family members and the like. Typically, two connections belonging to the same friend circle have more interactions with each other than friends belonging to two different circles.

Two connections may be determined to be closely associated with each other if they have high affinity with each other. The affinity between two connections may be determined based on factors including connection type, number of interactions between connections, types of interactions between the connections, and so on. Affinity between two connections may also be determined by matching the interests of the two connections. Interests of the connections can be determined based on their user profile information or based on their past actions. Information of past actions of a user relevant to determining a user's interest includes type of information retrieved by the user and type of information provided by the user to the social networking system 100, for example, via comments, likes/dislikes etc., and information discussed in communications.

Two connections may be determined to be associated with each other based on different types of information associated with the connection, for example, if they are determined to have attended an event together, if they belong to the same social group, if they graduated from the same educational organization, or if they are both tagged in an image. Two connections may be determined to be associated if the connections purchased deals belonging to the same category, or deals belonging to the same provider, or if they participated in a social deal. Two connections may be determined to be associated with each if they checked-in to a location together, for example, a location associated with the provider of the deal.

The factors used to match connections are weighted higher if the factors are associated with a particular deal. For example, an action comprising two connections participating in a deal in the past is weighted more than an action comprising the connections sending a message to each other. Similarly, an action comprising two connections checking into a location associated with a deal is weighted higher than two connections graduating from the same school.

Even if there are no interactions between a deal and a connection, an association may be created between the deal and the connection if there is a likelihood that the connection may interact with the deal. The likelihood of interactions may be determined based on a match between the connection and the deal, for example, by matching the interests of the connection with a category of the deal.

In general, associations between deals presented to a user can be determined based on a set of social entities associated with the user. A set of social entities associated with the user are selected such that they are also associated with each other. Deals associated with this set of social entities are presented together via the dashboard 130. The social entities can be connections of the user, social groups, events, other deals, communications between users, and the like. Furthermore, a deal is determined to be associated with a social entity if information describing the deal matches the social entity or if there are interactions between the deal and the social entity in the social networking system 100.

Deals categorized together based on social information associated with the user is presented together, for example, on the same screen of the dashboard 130. If the deals are categorized together based on information associated with a set of connections, information describing these connections is also presented on the dashboard 130 along with the deals. A user is more likely to pay attention to deals if the deals are related together in a social context. For example, if a user finds a set of deals of interest to the user's family, the user is likely to pay attention to the deals and perform an action using the deal.

Two or more sets of deals may be determined as being closely associated with each other for presentation to the user. Each set may be determined to be closely associated based on a corresponding set of connections. In this situation a set of deals is preferred over another set of deals based on an aggregate measure of affinity between the corresponding set of connections and the user. For example, if the user interacts more closely with a first set of connections compared to a second set of connections, the deals associated with the first set of connections are preferred over deals associated with the second set of connections. In this situation, the deals associated with the first set of connections may be presented more prominently compared to deals associated with other sets of connections. Alternatively, the deals associated with the first set of connections may be presented on a first page of a set of pages from a website whereas deals associated with other sets of connections may be presented on subsequent pages.

Figure 8:
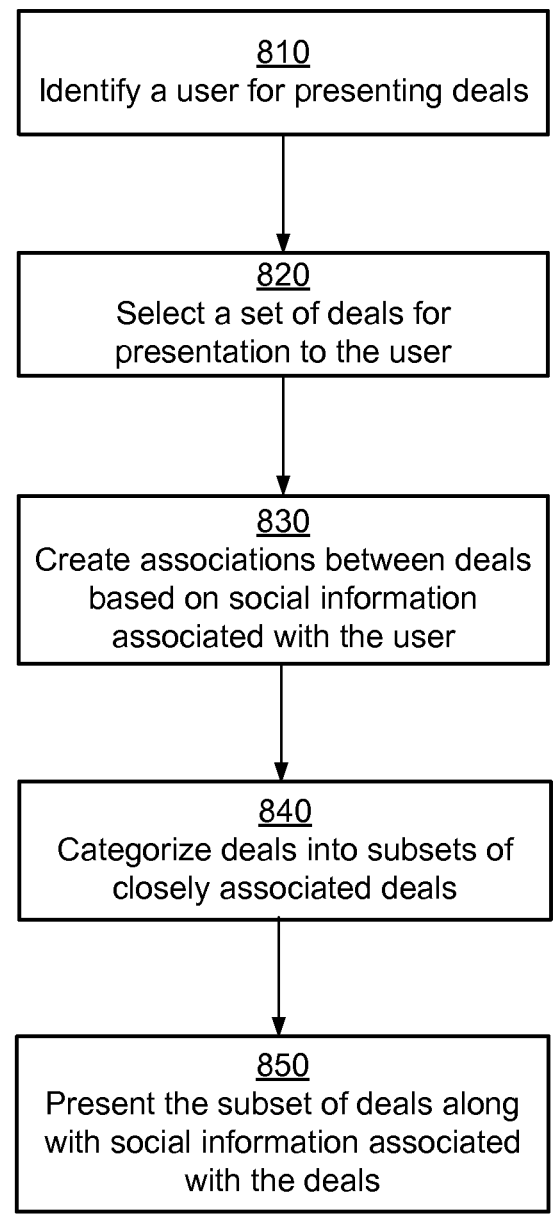
FIG. 8 is a flowchart of a process for categorizing deals based on social information for a user of the social networking system, in accordance with one embodiment of the invention.

FIG. 8 shows a flowchart of a process executed by the dashboard manager 115 for categorizing deals based on social information of a user. The dashboard manager 115 identifies a user for presenting deals of interest to the user. A user may send a request from a dashboard 130 requesting deals information. The request comprises information identifying the user that is used by the dashboard manager 115 for identifying the user.

The dashboard manager 115 selects 820 a set of deals for presentation to the user. In an embodiment, the dashboard manager 115 invokes the suggestion module 265 to execute the process described in FIG. 6 for determining the set of deals for presentation to the user. The dashboard manager 115 creates 830 associations between the selected deals based on social information associated with the user. Two or more deals may be associated together if they are associated with an entity represented in the social networking system and there is an association between the entity and the user.

For example, the dashboard manager 115 can associate a set of deals with each other based on a social group if members of the social group perform actions related to these deals. The dashboard manager 115 can associate deals with each other based on interactions between connections of the user if the connections refer to the deal in messages. For example, if two connections have discussed two deals in messages between each other, the two deals are determined to be associated with each other. The dashboard manager 115 can associate two deals with each other based on a connection if the same connection performs actions related to the deals. Two deals may be associated with each other via a trade show associated with the user, for example, if the deals are offered by two providers participating at the trade show.

The dashboard manager 115 uses the associations between the deals to categorize 840 the deals into subsets of closely associated deals. The dashboard manager 115 can represent the deals information as a graph comprising nodes representing the deals and the associations between the deals represented as edges. The edges can be weighted based on various factors indicating a strength of the association represented by the edge. Certain types of associations may be weighted more than other types. An association between two deals based on a connection of a user interacting with two deals may be weighted more than an association based on users of a group interacting with the deals if the users of the group are not connected to the user.

In an embodiment, the dashboard manager 115 creates graph representations based on different types of social information used to associate deals. This helps the dashboard manager 115 analyze different types of social information separately if the two types of information requires separate analysis. Associations between two deals based on different factors may be combined based on a weighted aggregate value combing scores associated with the different factors. In an embodiment, a factor for determining association between deals based on a social entity associated with the user may be weighted based on the strength of association between the user and the entity. For example, a connection may have strong associations with two deals, but if the connection rarely interacts with the user, the association between the deals based on this factor may be weighted less.

The dashboard manager 115 may determine subsets of closely associated deals from the graph representations by performing clustering analysis to determine clusters of deals. The deals belonging to a cluster are classified or categorized 840 together based on social information. The dashboard manager 115 presents 850 the subsets of deals categorized based on the social information to the user via the dashboard 130. Deals categorized together are presented together using the dashboard, for example, on the same screen.

The dashboard manager may send information describing deals to the dashboard 130 along with instructions to present deals closely associated with each other based on social information together. The dashboard manager 115 may also send instructions to the dashboard 130 to present social information used to categorize the deals along with the deals. For example, if a subset of deals is determined to be closely associated based on a subset of connections of the user, information describing the subset of connections may be presented along with the deals.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    storing, by a social networking system, information describing users and relations between users, wherein a user related to another user is identified as a connection of the other user;
    identifying a user of the social networking system;
    identifying a plurality of candidate deals received from providers;
    determining, by a processor, a plurality of circles of connections of the user, each circle of connections comprising users with whom the user has established a connection in the social networking system, each circle of connections determined based on affinities among the users in the circle of connections;
    selecting a circle of connections from the plurality of circles of connections;
    selecting, by the processor, a set of candidate deals comprising a first deal and a second deal from the plurality of candidate deals received from the providers, wherein the first deal is associated with a first connection and the second deal is associated with a second connection and the first and the second deal are selected responsive to determining that the first connection and the second connection are in a same circle of connections;
    sending information describing the selected set of candidate deals for presentation to the user with instructions to present the first deal and the second deal together via a user interface, wherein sending information describing the selected set of candidate deals for presentation to the user further comprises sending information describing one or more users of the selected circle of connections associated with the selected set of candidate deals for presentation to the user along with the selected set of candidate deals, and the user interface includes the first deal and the second deal together along with the information describing the one or more users of the selected circle of connections associated with the selected set of candidate deals;
    sending information describing criteria for activation of a first deal of the selected set of candidate deals for presentation to the user, wherein the user interface includes the information describing the criteria for activation of the first deal and the criteria includes at least one condition based on an interaction of the user with the user interface associated with the first deal or a location of the user; and
    activating the first deal responsive to the criteria being satisfied for the first deal, wherein the user interface includes an indication that the first deal is activated.

2. The computer-implemented method of claim 1, wherein the instructions to present the selected set of candidate deals comprise instructions to present information describing interactions between the one or more users of the selected circle of connections and the selected set of candidate deals.

3. The computer-implemented method of claim 1, wherein the one or more users of the selected circle of connections are selected based on a measure of affinity between the user and the one or more users.

4. The computer-implemented method of claim 1, wherein the information describing the association between the selected set of candidate deals and the one or more users of the selected circle of connections is based on actions performed by the one or more users, the actions related to the selected set of candidate deals.

5. The computer-implemented method of claim 4, wherein the actions performed by the one or more users related to a deal comprise one or more of purchasing the deal, commenting on the deal, liking the deal, checking-in to a location associated with the deal, or recommending the deal.

6. The computer-implemented method of claim 1, wherein the selected circle of connections is determined such that users belonging to the selected circle of connections have more interactions with each other compared to their interactions with users of another circle of connections from the plurality of circles of connections of the user.

7. The computer-implemented method of claim 1, wherein the selected circle of connections is determined based on users that are members of a social group of the social networking system.

8. The computer-implemented method of claim 1, wherein the selected circle of connections is determined based on users that graduated from a same school as a school of the user.

9. The computer-implemented method of claim 1, wherein the selected circle of connections is determined based on users that are determined to be members of a family.

10. The computer-implemented method of claim 1, wherein a candidate deal is selected from the selected set of candidate deals if the information describing the candidate deal matches actions of the one or more users of the selected circle of connections using the social networking system.

11. The computer-implemented method of claim 1, wherein a candidate deal is selected from the selected set of candidate deals if the information describing the candidate deal matches interests of the one or more users of the selected circle of connections.

12. The computer-implemented method of claim 1, wherein a candidate deal from the selected set of candidate deals is selected for presentation to the user if information describing the candidate deal matches actions of the user performed using the social networking system.

13. A non-transitory computer-readable storage medium storing computer-executable code, the code comprising instructions causing a processor to:
  identify a user of a social networking system;
  store by a social networking system, information associated with connections of the user comprising of information describing a connection of the user and information describing past actions of the connection, and information describing connections of the connection;
  identify a plurality of candidate deals received from providers;
  determine a plurality of circles of connections of the user, each circle of connections comprising users with whom the user has established a connection in the social networking system, each circle of connections determined based on affinities among the users in the circle of connections;
  select a circle of connections from the plurality of circle of connections;
  select a set of candidate deals comprising of a first deal and a second deal from the plurality of candidate deals received from the providers, wherein the first deal is associated with a first connection and the second deal is associated with a second connection and the first and the second deal are selected responsive to determining that the first connection and the second connection are in a same circle of connections;
  send information describing the set of deals for presentation to the user with instructions to present the first deal and the second deal together via a user interface, wherein to send information describing the selected set of candidate deals for presentation to the user further comprises to send information describing one or more users of the selected circle of connections associated with the selected set of candidate deals for presentation to the user along with the selected set of candidate deals, and the user interface includes the first deal and the second deal together along with the information describing the one or more users of the selected circle of connections associated with the selected set of candidate deals;
  send information describing criteria for activation of a first deal of the selected set of candidate deals for presentation to the user, wherein the user interface includes the information describing the criteria for activation of the first deal and the criteria includes at least one condition based on an interaction of the user with the user interface associated with the first deal or a location of the user; and
  activate the first deal responsive to the criteria being satisfied for the first deal, wherein the user interface includes an indication that the first deal is activated.

14. The non-transitory computer-readable storage medium of claim 13, wherein the instructions to present the selected set of candidate deals comprises instructions to present information describing interactions between the user and the one or more users of the selected circle of connections, the interactions associated with the selected set of candidate deals.

15. The non-transitory computer-readable storage medium of claim 13, wherein the information describing the association between the selected set of candidate deals and the one or more users of the selected circle of connections is selected based on a measure of affinity between the user and the one or more users of the circle of connections.

16. The non-transitory computer-readable storage medium of claim 13, wherein the information describing the association between the selected set of candidate deals and one or more users of the selected circle of connections is selected based on actions performed by the one or more users of the circle of connections.

17. The non-transitory computer-readable storage medium of claim 16, wherein actions performed by the one or more users related to a deal comprise one or more of purchasing the deal, commenting on the deal, liking the deal, checking-in to a location associated with the deal, or recommending the deal.

18. The non-transitory computer-readable storage medium of claim 16, wherein a candidate deal is selected from the selected set of candidate deals if the information describing the candidate deal matches interests of the one or more users of the selected circle of connections.

19. The non-transitory computer-readable storage medium of claim 16, wherein a candidate deal from the selected set of candidate deals is selected for presentation to the user if information describing the candidate deal matches actions of the user performed using the social networking system.

* * * * *